United States Patent Office 3,666,644
Patented May 30, 1972

3,666,644
PROCESS FOR PREPARING 2-HYDROXYALKYL-4(5)-NITROIMIDAZOLES
Janos Kollonitsch and Alan N. Scott, Westfield, N.J., assignors to Merck & Co., Inc., Rahway, N.J.
No Drawing. Continuation-in-part of application Ser. No. 607,642, Jan. 6, 1967. This application July 31, 1969, Ser. No. 846,583
Int. Cl. C07d 49/36; B01j 1/10
U.S. Cl. 204—158 HA          8 Claims

ABSTRACT OF THE DISCLOSURE 2-hydroxyalkyl-4(5)-nitroimidazoles are prepared by chlorinating 2-alkylimidazoles to produce the 2-α-chloroalkylimidazole, nitrating this compound to produce the 2-α-chloroalkyl-4(5)-nitroimidazole, and hydrolyzing this compound to the corresponding 2-hydroxyalkyl compound. The 2-hydroxyalkyl-4(5)-nitroimidazoles are useful in the preparation of the corresponding (1-methyl-5-nitroimidazol-2-yl)-alkyl carbamates. The (1-methyl-5-nitroimidazol-2-yl)-alkyl carbamates are useful in the treatment of protozoal diseases.

This application is a continuation-in-part of copending application Ser. No. 607,642, filed Jan. 6, 1967, now abandoned.

BACKGROUND OF THE INVENTION

The (1-methyl-5-nitroimidazol-2-yl)-alkyl carbamates are valuable compounds having activity against the causative organisms of the protozoal parasitic diseases trichomoniasis and enterohepatitis, the latter being a disease occuring primarily in turkeys which is caused by the protozoan parasite *Histomonas meleagridis*.

The present invention provides methods of preparing new intermediates useful for the preparation of these valuable antiprotozoal compounds.

SUMMARY OF THE INVENTION 2-chloroalkyl-4(5)-nitroimidazoles are hydrolyzed to produce the corresponding 2-hydroxyalkyl-4(5)-nitroimidazoles which are useful as intermediates in the preparation of antiprotozoal compounds.

The 2-chloroalkyl-4(5)-nitroimidazoles are produced by chlorinating a 2-alkylimidazole and nitrating the resulting 2-chloroalkylimidazole.

DESCRIPTION OF THE PREFERRED EMBODIMENTS

In accordance with one embodiment of this invention, compounds of the formula

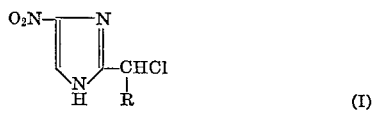
(I)

wherein R is lower alkyl such as methyl, ethyl, propyl and butyl, or hydrogen, are hydrolyzed to produce the corresponding hydroxy compound of the formula

(II)

This hydrolysis is conveniently effected by heating the chloro compound with water, preferably at an acidic pH, for sufficient time to completely hydrolyze the chloroalkyl group to hydroxy-alkyl. Thus, the hydrolysis is effected by heating the chloroalkyl compound with water at a pH of less than about 7 at a temperature between about 50°–100° C.

According to another embodiment of this invention, the chloroalkyl compounds of (I) above are prepared by chlorinating a 2-lower alkyl imidazole of the formula

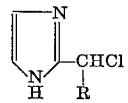

wherein R is as defined above, and nitrating the resulting 2-chloro lower alkyl imidazole. The step of introducing the α-chloro substituent is conveniently effected by passing chlorine through a solution of the 2-loweralkyl imidazole in a strong acid medium such as, for example, chlorosulfonic acid, fuming sulfuric acid, fluorosulfonic acid, or substantially anhydrous sulfuric acid, in the presence of a free radical initiating catalyst such as ultraviolet light. The chlorination may be carried out at a temperature between room temperature and about 100° C. The solution of the chlorinated imidazoles so obtained is then added to a mixture of fuming sulfuric acid and fuming nitric acid and the reaction allowed to proceed at a temperature between room temperature and about 100° C. for sufficient time to complete the nitration of the imidazole. The preferred reaction temperature, however, is between about 50° C.–100° C. The 2-chloroalkyl-4(5)-nitroimidazole so produced can then be separated from the reaction mixture by adding water or, preferably, ice to the resulting nitration mixture and extracting the nitroimidazole with a suitable water insoluble solvent, such as ethyl acetate. Evaporation of the solvent affords a crude mixture of the 2-chloroalkyl-4(5)-nitroimidazoles, which is dissolved in water and heated in order to hydrolyze the 2-chloroalkyl imidazole to the corresponding 2-hydroxyalkyl-4(5)-nitroimidazole. The desired 2-hydroxyalkyl imidazole is then recovered from the resulting hydrolysate by techniques known in the art.

The 2-hydroxyalkyl-4(5)-nitroimidazoles can be converted to the corresponding (1-methyl-5-nitroimidazol-2-yl)-alkyl carbamates by reaction with a loweralkyl- or phenylhaloformate such as methyl chloroformate or phenyl chloroformate to form a 4(5)-nitroimidazol-2-yl-alkyl carbamate and reacting the latter compound with an alkylating agent such as diazomethane or dimethylsulfate.

The following examples illustrate methods of carrying out these processes:

Example 1

24 grams (0.25 mole) of 2-ethylimidazole is dissolved in a mixture of 29 ml. of concentrated sulfuric acid and 29 ml. of 20% fuming sulfuric acid in a quartz flask. The resulting mixture is irradiated with two 450 watt mercury lamps and a rapid stream of chlorine is passed through the irradiated solution at a temperature below about 60° C. for about 35 minutes. The composition of the imidazoles in the resulting chlorinated solution as determined by NMR shows that the main product present is 2-(1'-chloroethyl)-imidazole.

The solution of the chlorinated imidazoles is added dropwise with good stirring to a mixture of 44 ml. of 65% fuming sulfuric acid and 16.5 ml. of red fuming nitric acid, the mixture being cooled in an ice-water bath. After the addition of the chlorinated imidazole is complete, the mixture is stirred at room temperature for one-half hour and is finally heated in a water bath at 50–60° C. for 2 hours. The nitration is shown to be complete by NMR determination of the product which shows that the aromatic proton peak had half the area of that of the starting solution and is shifted downfield.

A portion (14 ml., equivalent to 0.024 mole of imidazole) of the nitration mixture is added slowly with good stirring to 100 grams of ice. The resulting mixture contains oily imidazoles in suspension which are extracted with 3 × 15 ml. of ethyl acetate. The ethyl acetate extracts are evaporated to a yellow syrup which is dissolved in 40 ml. of hot water and heated on the steam bath to selectively hydrolyze the α-chloroethyl imidazoles. The solution is cooled slowly to 5° C. causing the 2-(1'-chloroethyl)-4(5)-nitroimidazole to separate as crystalline needles.

The resulting mother liquors are shown by NMR to contain about 85% 2-(1'-hydroxyethyl)-4(5)-nitroimidazole. The solution is adjusted to pH 3 with ammonium hydroxide and extracted with 4× 10 ml. of ethyl acetate. The extracts are evaporated to a syrup which is dissolved in a hot mixture of chloroform and acetone (1:1). When this solution is cooled, crystalline 2-(1'-hydroxyethyl)-4(5)-nitroimidazole precipitates which after recrystallization from a mixture of chloroform and acetone is found to melt at 145°–152° C. on the microscope hot stage.

Example 2

2-methylimidazole is chlorinated by the procedure of Example 1. After 140 minutes of chlorination, the mixture of the chlorinated imidazoles was found by NMR to contain mainly 2-chloromethylimidazole.

The solution of the chlorinated reaction product is then added to a mixture of fuming sulfuric acid and fuming nitric acid and the nitration carried out following the procedures described in Example 1 to afford 2-chloromethyl-4(5)-nitroimidazole.

The resulting nitration reaction mixture is quenched in ice, and the imidazoles extracted with ethyl acetate. Evaporation of the extracts and hydrolysis of the residue by heating in water for about 1 hour affords an aqueous solution containing the desired 2-hydroxymethyl-4(5)-nitroimidazole. This solution is adjusted to pH 3 with ammonium hydroxide and extracted with ethyl acetate. Evaporation of the extracts yields crude product which on recrystallization from acetone produces crystalline 2-hydroxymethyl-4(5)-nitroimidazole melting at 156°–158° C.

Example 3

The following illustrates a method by which the (1-methyl-5-nitroimidazol-2-yl)-alkyl carbamates can be prepared.

(A) 4(5) - nitroimidazol-2-yl-methyl phenyl carbonate.—A 10 ml. round-bottom flask fitted with a drying tube and a magnetic stirring bar is charged with 2 ml. pyridine and 0.435 gram of 2-hydroxymethyl-4(5)-nitroimidazole. The solution is cooled in an ice bath and 0.5 gram phenyl chloroformate is added portionwise with stirring. The precipitate which forms dissolves on stirring the mixture 1.5 hours at room temperature. The solution is then quenched on 10 grams ice and 20 ml. water. Crystallization takes place on stirring, and the product is filtered and dried to yield 0.5 gram of 4(5)-nitroimidazol-2-yl-methyl phenyl carbonate melting at 103°–104° C. (dec.). Recrystallization from ethyl acetate-cyclohexane gives product melting at 126°–127° C.

When this reaction is repeated using methyl chloroformate in place of phenyl chloroformate, the 4(5)-nitroimidazol-2-yl-methyl carbonate is obtained.

(B) 4(5)-nitroimidazol-2-yl-methyl carbamate.—A 2-neck 25 ml. flask equipped with a magnetic stirring bar, condenser, and gas inlet tube is cooled to −80° C. and then charged half full (~12 ml.) with liquid ammonia. Two hundred mg. of 4(5) - nitroimidazol-2-yl-methyl phenyl carbonate is added, and the mixture is stirred at room temperature under reflux for about 2 hours. The ammonia is then allowed to evaporate overnight. The residue is stirred with 10 ml. 50% cyclohexane-50% ether, and the 4(5)-nitroimidazol-2-yl-methyl carbamate is recovered by filtration. The product so obtained is recrystallized from acetonitrile to yield crystalline product melting at 180°–182° C.

When 4(5) - nitroimidazol - 2 - yl - methyl carbonate is reacted with liquid ammonia following the above procedure, 5-nitroimidazol-2-yl-methyl carbamate is produced in good yield.

(C) 1 - methyl - 5 - nitroimidazol-2-yl-methyl carbamate.—Eightly-five mg. of 4(5) - nitroimidazol - 2-yl-methyl-carbamate is dissolved in 5 ml. of warm methanol and 10 ml. dry ether is added. The resulting solution is cooled in an ice bath and 2 ml. of an ethereal diazomethane solution added. Nitrogen evolution is noted, and excess diazomethane solution (ca. 2 ml.) is added to the point where no more nitrogen is detected. The faintly-yellow solution is allowed to remain at room temperature for 0.5 hour and then concentrated to dryness. Crystalline 1 - methyl - 5 - nitroimidazol - 2 - yl-methyl carbamate melting at 165°–166° C. is obtained.

It should be understood that although this invention has been described with reference to particular embodiments thereof, changes and modifications may be made which are within its intended scope, and it should be limited only by the language of the appended claims.

What is claimed is:

1. The process for preparing a 2-chloro-loweralkyl-4(5)-nitroimidazole of the formula

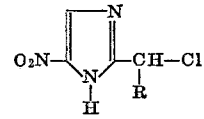

which comprises chlorinating a 2-loweralkylimidazole of the formula

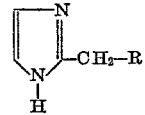

by passing chlorine into a strong acid solution of the loweralkylimidazole at a temperature between room temperature and about 100° C. in the presence of ultraviolet light and nitrating the 2-chloroalkylimidazole formed by adding the resulting solution at a temperature between room temperature and about 100° C. to a mixture of fuming sulfuric acid and fuming nitric acid, where R is loweralkyl or hydrogen.

2. The process according to claim 1 wherein the strong acid is selected from the group consisting of chlorosulfonic acid, fuming sulfuric acid, fluorosulfonic acid and sulfuric acid.

3. The process of claim 1 in which 2-ethylimidazole is chlorinated to produce 2-(1'-chloroethyl)-imidazole and this product is nitrated to produce 2-(1'-chloroethyl)-4-(5)-nitroimidazole.

4. The process of claim 1 in which 2-methylimidazole is chlorinated to produce 2-chloromethylimidazole and the latter product is nitrated to produce 2-chloromethyl-4(5)-nitroimidazole.

5. The process for the preparation of a compound of the formula

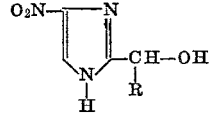

which comprises chlorinating a compound of the formula

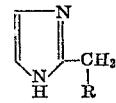

by passing chlorine into a strong acid solution of the loweralkylimidazole at a temperature between room temperature and about 100° C. in the presence of ultraviolet light to afford a first compound of the formula

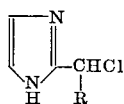

nitrating the latter compound in a mixture of fuming sulfuric acid and fuming nitric acid at a temperature between room temperature and about 100° C. to afford a second compound of the formula

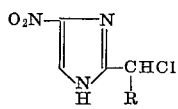

and hydrolyzing said second compound in water at a pH of less than 7 at a temperature between about 50°–100° C. to afford a compound of the formula

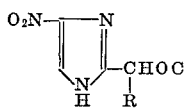

wherein R represents hydrogen or loweralkyl.

6. The process according to claim 5 wherein the strong acid is selected from the group consisting of chlorosulfonic acid, fuming sulfuric acid, fluorosulfonic acid and sulfuric acid.

7. The process of claim 5 wherein said second compound is 2-(1'-chloroethyl)-4(5)-nitroimidazole.

8. The process of claim 5 wherein said second compound is 2-chloromethyl-4(5)-nitroimidazole.

References Cited

UNITED STATES PATENTS

| | | | |
|---|---|---|---|
| 1,761,475 | 6/1930 | Gubelmann et al. | 204—158 HA |
| 2,821,551 | 1/1958 | Katzschmann | 260—618 D |
| 2,898,381 | 8/1959 | Tinsley | 260—646 |
| 3,067,182 | 12/1962 | Jones | 260—651 HA |
| 3,173,919 | 3/1965 | Johnston et al. | 204—158 HA |
| 3,238,243 | 3/1966 | Falbe et al. | 204—158 HA |
| 3,299,090 | 1/1967 | Hoff et al. | 260—309 |

OTHER REFERENCES

Cram et al.: Organic Chemistry 2nd ed., pp. 242–4, N.Y., McGraw Hill, 1964.

Fieser et al.: Organic Chemistry 3rd ed., p. 115, N.Y., Reinhold, 1956.

Hofmann: Imidazole and its Derivatives Part I, pp. 127–31 N.Y., Interscience, 1953.

Jocelyn: Chem. Abst., vol. 52, column 1147 (1958).

May & Baker: Chem. Abst., vol. 62, column 9142 (1965).

Merck: Chem. Abst., vol. 63, column 18097 (1965).

Merck: Netherlands Application 6503901, September 1963, 260–309, 1 page drawing pp. 1–8 and 11–15 relied on.

Merck: Netherlands Application 6717043, July 1968 (July 8, 1968), 260–309, 1 page, drawing, 5 pages spec.

NATALIE TROUSOF, Primary Examiner

U.S. Cl. X.R.

260—309, 688, 694, 999